United States Patent
Li et al.

(10) Patent No.: US 9,356,969 B2
(45) Date of Patent: May 31, 2016

(54) TECHNOLOGIES FOR MULTI-FACTOR SECURITY ANALYSIS AND RUNTIME CONTROL

(71) Applicants: Hong Li, El Dorado Hills, CA (US); Prashant Dewan, Hillsboro, OR (US)

(72) Inventors: Hong Li, El Dorado Hills, CA (US); Prashant Dewan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 37 days.

(21) Appl. No.: 14/493,814

(22) Filed: Sep. 23, 2014

(65) Prior Publication Data

US 2016/0088019 A1   Mar. 24, 2016

(51) Int. Cl.
| | | |
|---|---|---|
| G06F 21/31 | (2013.01) | |
| G06F 21/62 | (2013.01) | |
| H04L 29/06 | (2006.01) | |
| H04L 29/08 | (2006.01) | |

(52) U.S. Cl.
CPC ............ *H04L 63/20* (2013.01); *H04L 63/1416* (2013.01); *H04L 67/02* (2013.01)

(58) Field of Classification Search
CPC ...... H04L 63/20; H04L 63/1416; H04L 67/02
USPC .......................................................... 726/1–7
See application file for complete search history.

(56) References Cited

U.S. PATENT DOCUMENTS

| | | | | |
|---|---|---|---|---|
| 6,226,372 | B1 * | 5/2001 | Beebe ................. | H04L 63/0218 379/145 |
| 6,249,575 | B1 * | 6/2001 | Heilmann ........... | H04L 63/0218 379/189 |
| 6,718,024 | B1 * | 4/2004 | Heilmann ........... | H04L 63/0218 379/189 |
| 8,230,088 | B2 | 7/2012 | Herman et al. | |
| 8,392,973 | B2 | 3/2013 | Bank et al. | |
| 8,566,901 | B2 | 10/2013 | Kay et al. | |
| 8,856,864 | B2 | 10/2014 | Li et al. | |
| 2002/0021791 | A1 * | 2/2002 | Heilmann ............ | H04L 63/105 379/189 |
| 2003/0177248 | A1 | 9/2003 | Brown et al. | |
| 2006/0070129 | A1 * | 3/2006 | Sobel .................... | H04L 63/105 726/23 |
| 2006/0075140 | A1 * | 4/2006 | Sobel .................... | H04L 63/105 709/245 |

(Continued)

FOREIGN PATENT DOCUMENTS

| | | |
|---|---|---|
| JP | 2010-157211 A | 7/2010 |
| WO | 2014/105856 A1 | 7/2014 |

OTHER PUBLICATIONS

International Search Report and Written Opinion received for PCT Patent Application No. PCT/US2013/077567, mailed on Apr. 1, 2014, 9 pages.

(Continued)

*Primary Examiner* — Haresh N Patel
(74) *Attorney, Agent, or Firm* — Barnes & Thornburg LLP

(57) ABSTRACT

Technologies for client-level web application runtime control and multi-factor security analysis by a computing device include receiving application code associated with a browser-based application from a web server. The computing device collects real-time data generated by at least one sensor of the computing device and performs a multi-factor security assessment of the browser-based application as a function of the collected real-time data and the application code. Further, the computing device establishes a client-level web application runtime security policy associated with the browser-based application in response to performing the multi-factor security assessment and enforces the client-level web application runtime security policy.

23 Claims, 7 Drawing Sheets

(56) References Cited

U.S. PATENT DOCUMENTS

| | | | |
|---|---|---|---|
| 2006/0143179 A1* | 6/2006 | Draluk | H04L 63/20 707/999.009 |
| 2008/0010683 A1 | 1/2008 | Baddour et al. | |
| 2008/0104699 A1 | 5/2008 | Gounares et al. | |
| 2008/0222238 A1 | 9/2008 | Ivanov et al. | |
| 2009/0070873 A1 | 3/2009 | McAfee et al. | |
| 2009/0249489 A1 | 10/2009 | Livshits et al. | |
| 2009/0281845 A1* | 11/2009 | Fukuda | G06Q 10/10 705/7.39 |
| 2010/0169974 A1 | 7/2010 | Calendino et al. | |
| 2010/0235885 A1 | 9/2010 | Persson et al. | |
| 2010/0332837 A1 | 12/2010 | Osterwalder | |
| 2011/0145926 A1 | 6/2011 | Dalcher et al. | |
| 2011/0167474 A1 | 7/2011 | Sinha et al. | |
| 2011/0317211 A1 | 12/2011 | Yamada et al. | |
| 2012/0011360 A1* | 1/2012 | Engels | H04L 9/006 713/166 |
| 2012/0102483 A1* | 4/2012 | Goldman | G06F 8/36 717/174 |
| 2012/0102485 A1* | 4/2012 | Goldman | G06F 8/64 717/176 |
| 2012/0110174 A1 | 5/2012 | Wootton et al. | |
| 2012/0192280 A1 | 7/2012 | Venkatakrishnan et al. | |
| 2012/0216133 A1 | 8/2012 | Barker et al. | |
| 2013/0055387 A1 | 2/2013 | Kim et al. | |
| 2014/0006711 A1 | 1/2014 | Xing | |
| 2014/0090009 A1 | 3/2014 | Li et al. | |
| 2014/0090066 A1 | 3/2014 | Li et al. | |
| 2014/0096178 A1* | 4/2014 | Shippy | G06F 21/316 726/1 |
| 2014/0096241 A1 | 4/2014 | Li et al. | |
| 2014/0130187 A1 | 5/2014 | Prashant et al. | |
| 2014/0181888 A1 | 6/2014 | Li et al. | |
| 2014/0189777 A1* | 7/2014 | Viswanathan | H04L 63/205 726/1 |
| 2014/0189778 A1 | 7/2014 | Li et al. | |
| 2014/0310800 A1* | 10/2014 | Kabra | G06F 21/44 726/17 |
| 2014/0325644 A1* | 10/2014 | Oberg | G06F 21/51 726/22 |
| 2014/0331280 A1* | 11/2014 | Porras | H04L 63/20 726/1 |
| 2014/0331317 A1* | 11/2014 | Singh | G06F 21/52 726/22 |
| 2014/0380425 A1* | 12/2014 | Lockett | H04L 63/20 726/4 |

OTHER PUBLICATIONS

Wikipedia, "Code signing, Wikipedia, The Free Encyclopedia", retrieved on Nov. 5, 2014, 3 pages. retrieved from: http://en.wikipedia.org/wiki/Code_signing.

Wikipedia, "Web container, Wikipedia, The Free Encyclopedia", retrieved on Nov. 5, 2014, 2 pages. retrieved from: http://en.wikipedia.org/wiki/Web_container.

* cited by examiner

TECHNOLOGIES FOR MULTI-FACTOR SECURITY ANALYSIS AND RUNTIME CONTROL

BACKGROUND

Access controls may be imposed on browser-based applications at various stages. For example, developers of browser-based applications may configure access controls at design time for security and other related purposes. Additionally, in some circumstances, users are able to establish further access controls for browser-based applications at application launch time. With many browser-based applications, users can configure passwords, identifiers (IDs), and allow or disallow the execution of certain application code using a web browser when a browser-based application is launched and/or based on static security settings.

Application containers are used to execute applications on computing devices in a secure environment. Existing application containers permit users to apply filters and access controls to device attributes. However, those application containers are configured at design time and, therefore, the ability to configure the security features of the application containers at run-time is limited.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
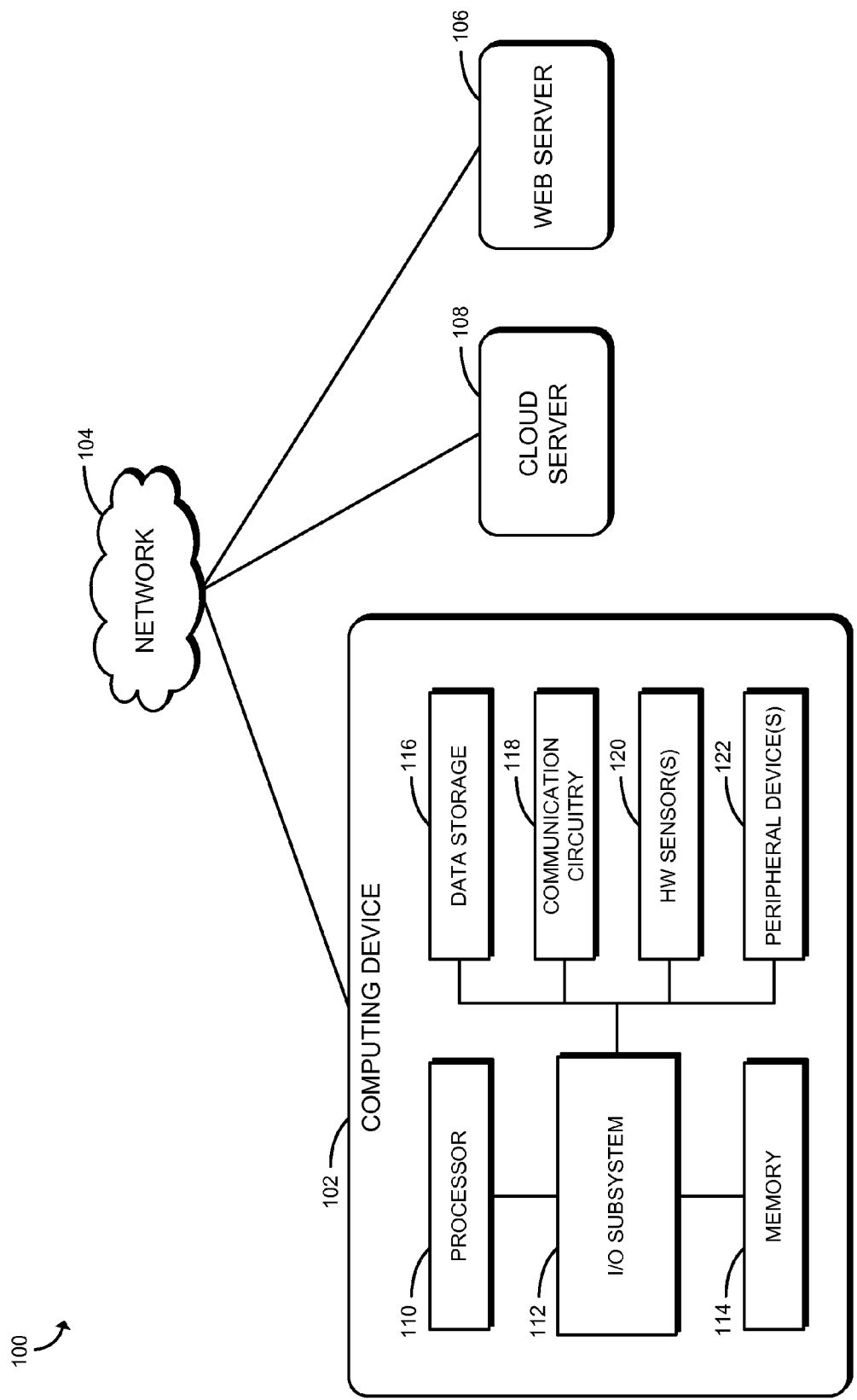
FIG. 1 is a simplified block diagram of at least one embodiment of a system for client-level web application runtime control and multi-factor security analysis.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system for client-level web application runtime control and multi-factor security analysis includes a computing device 102, a network 104, a web server 106, and a cloud server 108. As described in more detail below, in use, the computing device 102 may receive a browser-based application (e.g., a Hyper Text Markup Language (HTML) 5 application) from the web server 106 and perform a multi-factor security assessment of the browser-based application based on real-time data collected by the computing device 102. The computing device 102 may establish and enforce runtime access controls for the browser-based application based on the multi-factor security assessment. For example, in some embodiments, the system 100 allows the computing device 102 to disable, or otherwise control, certain HTML 5 (or other browser-based application) features based on established runtime security policies. Further, in addition to access controls applied at design time by the developer and at application launch time by the user, the system 100 permits the computing device 102 to establish runtime access controls as discussed in more detail below.

The computing device 102 may be embodied as any type of computing device capable of performing the functions described herein. For example, the computing device 102 may be embodied as a desktop computer, server, router, switch, laptop computer, tablet computer, notebook, netbook, Ultrabook™, cellular phone, smartphone, wearable computing device, personal digital assistant, mobile Internet device, Hybrid device, and/or any other computing/communication device. As shown in FIG. 1, the illustrative computing device 102 includes a processor 110, an input/output ("I/O") subsystem 112, a memory 114, a data storage 116, a communication circuitry 118, one or more hardware sensors 120, and one or more peripheral devices 122. Of course, the computing device 102 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the computing device 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the computing device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the computing device 102, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. The data storage 116 and/or the memory 114 may store various data useful in the operation of the computing device 102 as discussed below.

The communication circuitry 118 of the computing device 102 may be embodied as any communication circuitry, device, or collection thereof, capable of enabling communications between the computing device 102 and other remote devices (e.g., the web server 106 and/or the cloud sever 108). The communication circuitry 118 may be configured to use any one or more communication technologies (e.g., wireless or wired communications) and associated protocols (e.g., Ethernet, Bluetooth®, Wi-Fi®, WiMAX, etc.) to effect such communication.

The hardware sensors 120 generate/collect sensor data associated with the computing device 102 (e.g., its context, environment, and/or other characteristics). Each of the hardware sensors 120 may be embodied as any type of sensor or sensor circuitry to detect, capture, measure, or sense any suitable aspect of the local environment of the computing device 102. In various embodiments, the hardware sensors 120 may be embodied as, or otherwise include, for example, inertial sensors, proximity sensors, optical sensors, light sensors, audio sensors, temperature sensors, motion sensors, piezoelectric sensors, pressure sensors, and/or other types of sensors that generate data useful to the computing device 102 and/or other computing devices (e.g., the cloud server 108).

For example, in some embodiments, the hardware sensors 120 may include location sensors (e.g., global positioning system (GPS) sensors), temporal sensors (e.g., clocks), and/or other hardware sensors 120. Of course, the computing device 102 may also include components and/or devices configured to facilitate the use of the hardware sensors 120. Further, in some embodiments, the computing device 102 includes one or more software sensors that generate data based on various software context sources (e.g., social networks, device interactions, user information, etc.) of the computing device 102.

The peripheral devices 122 may include any number of additional peripheral or interface devices, such as speakers, microphones, additional storage devices, and so forth. The particular devices included in the peripheral devices 122 may depend on, for example, the type and/or intended use of the computing device 102.

The network 104 may be embodied as any type of communication network capable of facilitating communication between the computing device 102 and remote devices (e.g., the web server 106 and/or the cloud server 108). As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), an ad hoc network, or any combination thereof.

The web server 106 and/or the cloud server 108 may be embodied as any type of computing device capable of performing the functions described herein. For example, in some embodiments, the web server 106 and/or the cloud server 108 may be similar to the computing device 102 described above. For example, the web server 106 and/or the cloud server 108 may be embodied as an enterprise-level server computer, desktop computer, server, router, switch, laptop computer, tablet computer, notebook, netbook, Ultrabook™, cellular phone, smartphone, wearable computing device, personal digital assistant, mobile Internet device, Hybrid device, and/or any other computing/communication device. Further, the web server 106 and/or the cloud server 108 may include components similar to those of the computing device 102 discussed above. The description of those components of the computing device 102 is equally applicable to the description of components of the web server 106 and the cloud server 108 and is not repeated herein for clarity of the description. Further, it should be appreciated that the web server 106 and/or the cloud server 108 may include other components, sub-components, and devices commonly found in a computing device, which are not discussed above in reference to the computing device 102 and not discussed herein for clarity of the description. Additionally, in some embodiments, one or more of the components of the computing device 102 may be omitted from the web server 106 and/or the cloud server 108 (e.g., the hardware sensors 120 and/or the peripheral devices 122).

Although only one computing device 102, one network 104, one web server 106, and one cloud server 108 are shown in the illustrative embodiment of FIG. 1, the system 100 may include multiple computing devices 102, networks 104, web servers 106, and/or cloud servers 108 in other embodiments. For example, the computing device 102 may retrieve browser-based applications from multiple web servers 106 and/or receive remote code analyses (e.g., real-time code simulation results) from multiple cloud servers 108 in some embodiments.

Figure 2:
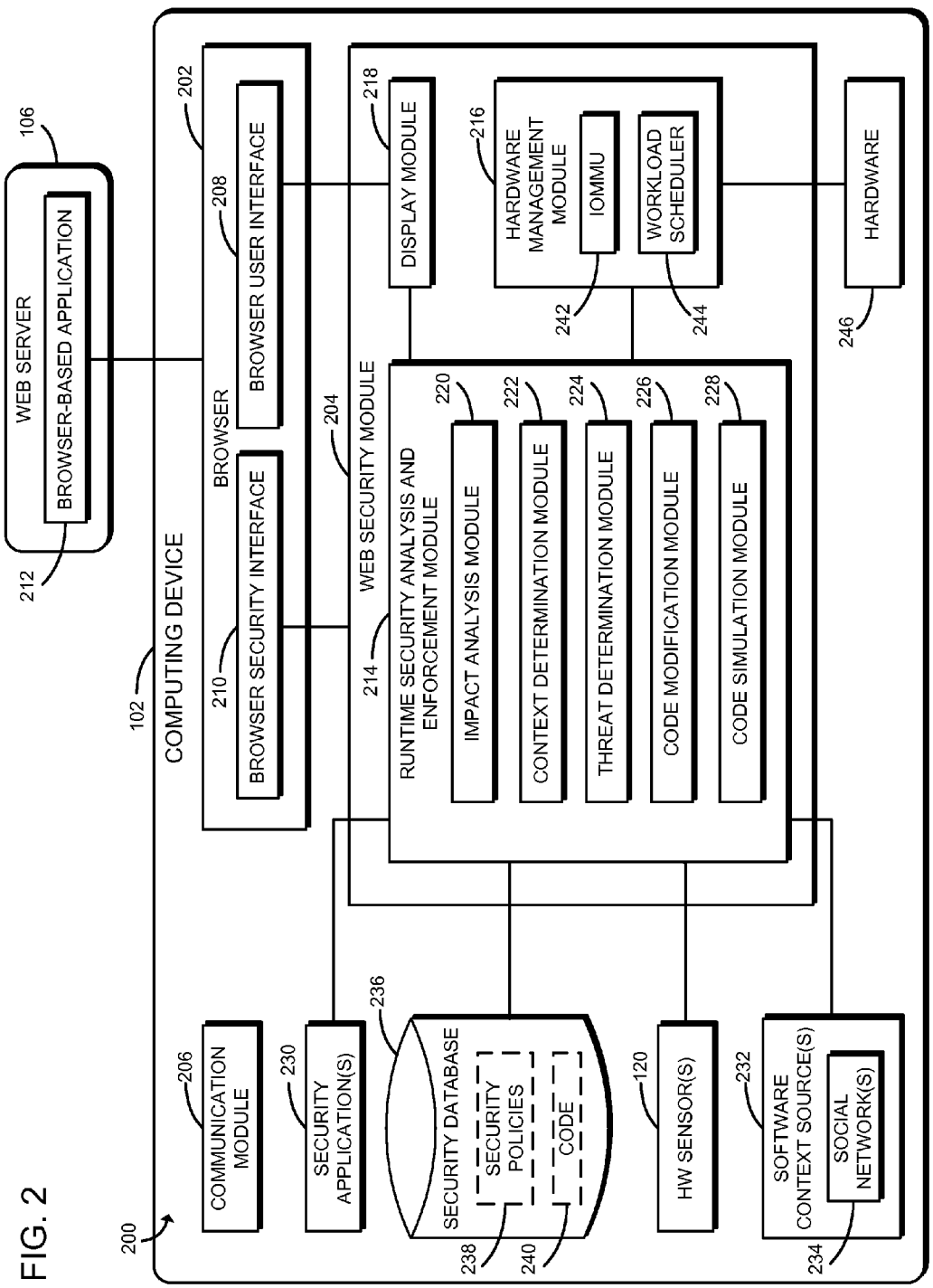
FIG. 2 is a simplified block diagram of at least one embodiment of an environment of a computing device of the system of FIG. 1.

Referring now to FIG. 2, in use, the computing device 102 establishes an environment 200 for client-level web application runtime control and multi-factor security analysis. The illustrative environment 200 of the computing device 102 includes a browser 202, a web security module 204, and a communication module 206. Each of the modules of the environment 200 may be embodied as hardware, software, firmware, or a combination thereof. Additionally, in some embodiments, one or more of the illustrative modules may form a portion of another module and/or one or more of the illustrative modules may be embodied as a standalone or independent module. For example, each of the modules, logic, and other components of the environment 200 may form a portion of, or otherwise be established by, the processor 110 of the computing device 102.

In the illustrative embodiment, the browser 202 includes a browser user interface 208 and a browser security interface 210. The browser 202 may be embodied as any type of web browser or similar application capable of retrieving a browser-based application 212 from the web server 106 and presenting the browser-based application 212 to the user on the computing device 102. In doing so, the browser 202 may, for example, utilize Uniform Resource Identifiers (URIs). In various embodiments, the browser 202 may be embodied as, for example, an Internet Explorer browser, which is commercially available from Microsoft Corp. of Redmond, Wash.; a Firefox browser, which is commercially available from Mozilla Corp. of Mountain View, Calif., a Safari browser, which commercially available from Apple Inc. of Cupertino, Calif., a Chrome browser, which is commercially available from Google, Inc. of Mountain View Calif.; an Opera browser, which is commercially available from Opera Software ASA of Oslo, Norway; an Android-based browser, or other web browser or the like. The browser-based application 212 may be embodied as any type of application capable of being interpreted by the corresponding browser 202 (e.g., an HTML 5 application).

The browser user interface 208 allows the user of the computing device 102 to interact passively and/or actively with the browser-based application 212. That is, the browser user interface 208 permits user input and/or output to the user. For example, the browser user interface 208 may display the browser-based application 212 on a peripheral device 122 (e.g., a display) of the computing device 102. Additionally, the browser user interface 208 may receive user-entered input (e.g., user configurations).

The browser security interface 210 acts as an interface between the browser 202 and the web security module 204. The browser security interface 210 intercepts the application code for the browser-based application 212 and captures user access control configurations when the browser-based application 212 is launched (i.e., at launch time). Further, as discussed in detail below, the browser security interface 210 generates machine-executable code and an access control map for the application code associated with the browser-based application 212. In some embodiments, the browser security interface 210 generates the access control map based on design time rules established by the developer and user configurations.

In the illustrative embodiment, the web security module 204 includes a runtime security analysis and enforcement module 214, a hardware management module 216, and a display module 218. As discussed below, the web security module 204 collects real-time data generated by one or more sensors of the computing device 102 (e.g., hardware sensors 120 and/or software context sources 232), establishes and enforces a client-level web application runtime security policy, and monitors hardware, firmware, and/or software access attempts by the browser-based application 212. In some embodiments, the web security module 204 may include a secure web application container. That is, the web security module 204 may be embodied as, for example, a sandbox or application control container for separating programs that are executing. Although the web security module 204 is shown as a static module in the illustrative embodiment of FIG. 2, in other embodiments, the web security module 204 and/or another secure web application container may be generated in response to the launching of the browser-based application 212.

The runtime security analysis and enforcement module 214 collects various real-time data, performs a multi-factor security assessment of the browser-based application 212, and establishes a client-level web application runtime security policy based on the security assessment (an "application runtime security policy" or "runtime security policy"). For example, the real-time data may be embodied as data generated by the sensors (e.g., hardware and/or software sensors) while the computing device 102 attempts to execute, analyze, or otherwise perform a function associated with the browser-based application 212. The runtime security policy and/or other policies may be stored in a security database 236 of the computing device 102 (e.g., as security policies 238). In some embodiments, the runtime security analysis and enforcement module 214 receives or collects real-time security monitoring data from other local security applications 230 such as malware detection, prevention, and/or removal applications (e.g., those security applications commercially available from McAfee, Inc. of Santa Clara, Calif.) as it pertains to the browser-based application 212 to be executed. Additionally or alternatively, the communication module 206 may receive a security assessment of the browser-based application 212 from the cloud server 108 and/or another remote computing device. For example, the communication module 206 may transmit the application code or machine-executable code of the browser-based application 212 to a remote anti-malware system for analysis (e.g., a cloud-based anti-virus system or a remote anti-virus service in an enterprise environment). Alternatively or in addition, the communication module 206 may receive a remote security assessment of the browser-based application 212 from another computing device's web security module or runtime security analysis and enforcement module (i.e., from another computing device similar to computing device 102). In such embodiments, the communication module 206 may provide the remote security assessment to the runtime security analysis and enforcement module 214 for further use. Further, in some embodiments, the runtime security analysis and enforcement module 214 may collect data from other computing devices (e.g., devices similar to the computing device 102) useful in performing a multi-factor security assessment (e.g., forensic data, security data, context data, and/or other useful data).

As discussed herein, the runtime security analysis and enforcement module 214 collects real-time data and performs a multi-factor security assessment based, at least in part, on the collected real-time data. In the illustrative embodiment, the runtime security analysis and enforcement module 214 includes an impact analysis module 220, a context determination module 222, a threat determination module 224, a code modification module 226, and a code simulation module 228. The impact analysis module 220 determines an impact of executing the browser-based application 212 or, more particularly, the corresponding machine-executable application code of the browser-based application 212. In some embodiments, the impact analysis module 220 determines the impact of executing the browser-based application 212 on one or more parameters of the operation of the computing device 102 unrelated to the maliciousness aspect of the browser-based application 212 (e.g., not specifically directed to the security of the browser-based application 212 itself). For example, a maliciousness aspect of the application code may be directed to whether the application code attempts to perform unauthorized graphical rendering modifications, whereas a parameter of operation unrelated to the maliciousness of the browser-based application 212 may be the speed of execution of the computing device 102. That is, the impact analysis module 220 may determine the potential impact of the browser-based application 212 on non-security factors of the computing device 102.

In other words, the impact analysis module 220 may determine whether the execution of the browser-based application 212 would negatively impact the operation of the computing device 102 in one or more ways. For example, the impact analysis module 220 may determine the potential impact of executing the browser-based application 212 on the performance, latency, power consumption, bandwidth, and/or another parameter of the operation of the computing device 102. Further, in some embodiments, the impact analysis module 220 may determine the impact of executing the browser-based application 212 on the performance of another application or feature of the computing device 102 (e.g., a different browser-based application 212, the operating system of the computing device 102, a critical task of the computing device 102, and/or another application or feature). It should be appreciated that, in some embodiments, the impact analysis module 220 may determine whether a subset of the browser-based application 212 (e.g., a portion of the corresponding machine-executable code) would somehow impact the operation of the computing device 102.

The context determination module 222 determines a context of the computing device 102 based on data generated by one or more hardware sensors 120 and/or software context sources 232 (e.g., software sensors). As indicated above, the hardware sensors 120 generate sensor data associated with the computing device 102 such as environment and/or other characteristics of the computing device 102. For example, the hardware sensors 120 may generate data associated with the location of the computing device 102 (e.g., GPS coordinates), a particular time or elapsed period of time, and/or other suitable sensor data. The one or more software context sources 232 generate/collect data associated a virtual presence and/or relationships of the computing device 102 and/or the user. For example, the software context sources 232 may include one or more social networks 234, which may include a vast array of information regarding the computing device 102 and/or the user of the computing device 102. In some embodiments, the software context sources 232 may generate data associated with the user's connection to a cloud environment, an application being executed or stored on the computing device 102, the social networks 234 of the user, reputation-based services, location-based services (e.g., physical and/or virtual), and various other information regarding the user and/or the computing device 102. In some embodiments, the context determination module 222 may determine what the user and/or computing device 102 is currently doing, the current environment of the computing device 102 (e.g., whether the computing device 102 is in an enterprise environment, at the user's home, in a hotel, in a different country than the country of origin; whether the user is banking, playing a game, or performing another task; etc.), and/or other contextual information regarding the computing device 102 and its user.

The threat determination module 224 determines the real-time threat level of one or more networks 104 of the computing device 102. In particular, in some embodiments, the threat determination module 224 determines a real-time (i.e., current) threat level of the Internet. For example, the threat determination module 224 may determine whether there are new attacks or new viruses pose a risk to the security of the Internet and/or another network 104. If so, the runtime security analysis and enforcement module 214 may modify various factors (e.g., allowance limits) of the runtime security policy to ensure the computing device 102 is secure. In other embodiments, the threat determination module 224 may determine the threat level of a more specific network 104 (e.g., an enterprise-level network or local area network) in addition to, or in the alternative to, determining a threat level of the Internet generally.

The code modification module 226 determines whether the browser-based application 212 or, more specifically, the corresponding machine-executable application code is modifiable to eliminate execution of impermissible code and, if so, may modify the application code to eliminate the execution of that impermissible code. For example, the code modification module 226 may determine whether the application code includes unsecure, unsafe, malicious, and/or other code that, if executed, could pose a security risk to the computing device 102 or otherwise negatively impact the operation of the computing device 102 (e.g., code that negatively impacts a non-security parameters of the computing device 102). It should be appreciated that code may be unsecure if it includes code that was written to intentionally cause some malicious effect; however, code may also be unintentionally unsecure due to poorly written code, conflicts with other code, and/or myriad other reasons. In some embodiments, the code modification module 226 may analyze the application code to determine whether certain types of instructions (e.g., data accesses or, more particularly, secure data accesses) are included in the application code. In doing so, the code modification module 226 may, for example, compare the application code and/or specific instructions (or instruction types) included in the application code to a security policy 238 of the computing device 102. It should be appreciated that the computing device 102 may permit the browser-based application 212 to access some resources of the computing device 102 and not others depending on the particular embodiment. In some embodiments, the code modification module 226 determines whether to modify the application code based on code simulation results received from the cloud server 108 and/or generated by the computing device 102 itself.

The code simulation module 228 manages the simulation of the browser-based application 212 code. In some embodiments, the code simulation module 228 transmits (e.g., via the communication module 206) the application code, or a portion thereof, to the cloud server 108 or otherwise requests the cloud server 108 to perform cloud-based simulation of the application code. In such embodiments, the cloud server 108 may utilize one or more simulators or emulators to determine whether the application code is secure and transmit the simulation results to the computing device 102 (e.g., for consideration in generating a multi-factor security assessment). Further, the code simulation module 228 may establish or otherwise utilize a secure execution environment (e.g., a secure application container) for secure local simulation of the application code. Depending on the particular embodiment, the code simulation module 228 may simulate application code 240 in real-time or save application code 240 in the security database 236 for subsequent simulation and/or analysis. For example, in some embodiments, the code simulation module 228 may simulate application code 240 while the processor 110 has "downtime" (e.g., unused clock cycles or processing capacity). It should be appreciated that the application code may be simulated based on user configurations, design time rules, and/or preliminary runtime rules. In another embodiment, the code simulation module 228 may prompt the user (e.g., via the browser user interface 208) to request user input regarding the simulation parameters such as which security policies 238 to utilize for the simulation, where to perform the simulation (e.g., locally or remotely), when to perform the simulation (e.g., in real-time or at a later point in time), and/or for other information.

As described below, the runtime security analysis and enforcement module 214 performs a multi-factor security assessment of the browser-based application 212 as a function of the collected real-time data (e.g., the impact data, the contextual information, the threat information, code modifications, simulation results, security monitoring data, etc.), the application code, and/or the access control map. Additionally, the runtime security analysis and enforcement module 214 establishes a runtime security policy for the browser-based application 212, which may include various hardware, firmware, and/or software access rules and/or mediation security rules. In some embodiments, the runtime security analysis and enforcement module 214 monitors hardware access attempts by the browser-based application 212 and interfaces with the hardware management module 216 to restrict access to certain hardware 246 of the computing device 102. Similarly, in some embodiments, the runtime security analysis and enforcement module 214 monitors firmware and/or software access attempts by the browser-based application 212 and restricts access to certain firmware and/or software of the computing device 102 or otherwise enforces firmware/software access rules established in the runtime security policy.

The hardware management module 216 includes an input/output memory management unit (IOMMU) 242 and a workload scheduler 244. The hardware management module 216 works with the runtime security analysis and enforcement module 214 to enforce hardware access rules established in the runtime security policy. For example, the runtime security policy may require that a critical section of the memory 114 of the computing device 102 be inaccessible to the browser-based application 212. In such an embodiment, the runtime security analysis and enforcement module 214 monitors access attempts to that section of the memory 114 by the browser-based application 212 and permits only secure access attempts (e.g., only permits secure application code to be sent to the hardware 246 for execution). The runtime security analysis and enforcement module 214 instructs the hardware management module 216 (e.g., via transmitted instructions) to deny unsecure and/or unauthorized accesses to the hardware 246 using the input/output memory management unit 242. Similarly, the workload scheduler 244 of the hardware management module 216 restricts accesses to other hardware components of the computing device 102 (e.g., the processor 110, etc.) and enforces the amount of time a particular workload may execute before it must be aborted in accordance with the runtime security policy.

The display module 218 interfaces between the runtime security analysis and enforcement module 214 and the browser user interface 208 to provide the user of the computing device 102 with information regarding the security of the browser-based application 212. That is, the display module 218 provides data to the browser user interface 208 for display on the browser 202 of the computing device 102. In some embodiments, the display module 218 permits the user to view security assessment results, alerts, notifications, recommendations, and/or other information from the runtime security analysis and enforcement module 214 or the web security module 204. Additionally, the communication module 206 handles the communication between the computing device 102 and remote devices (e.g., the web server 106 and/or the cloud server 108) through the network 104.

Figure 3:
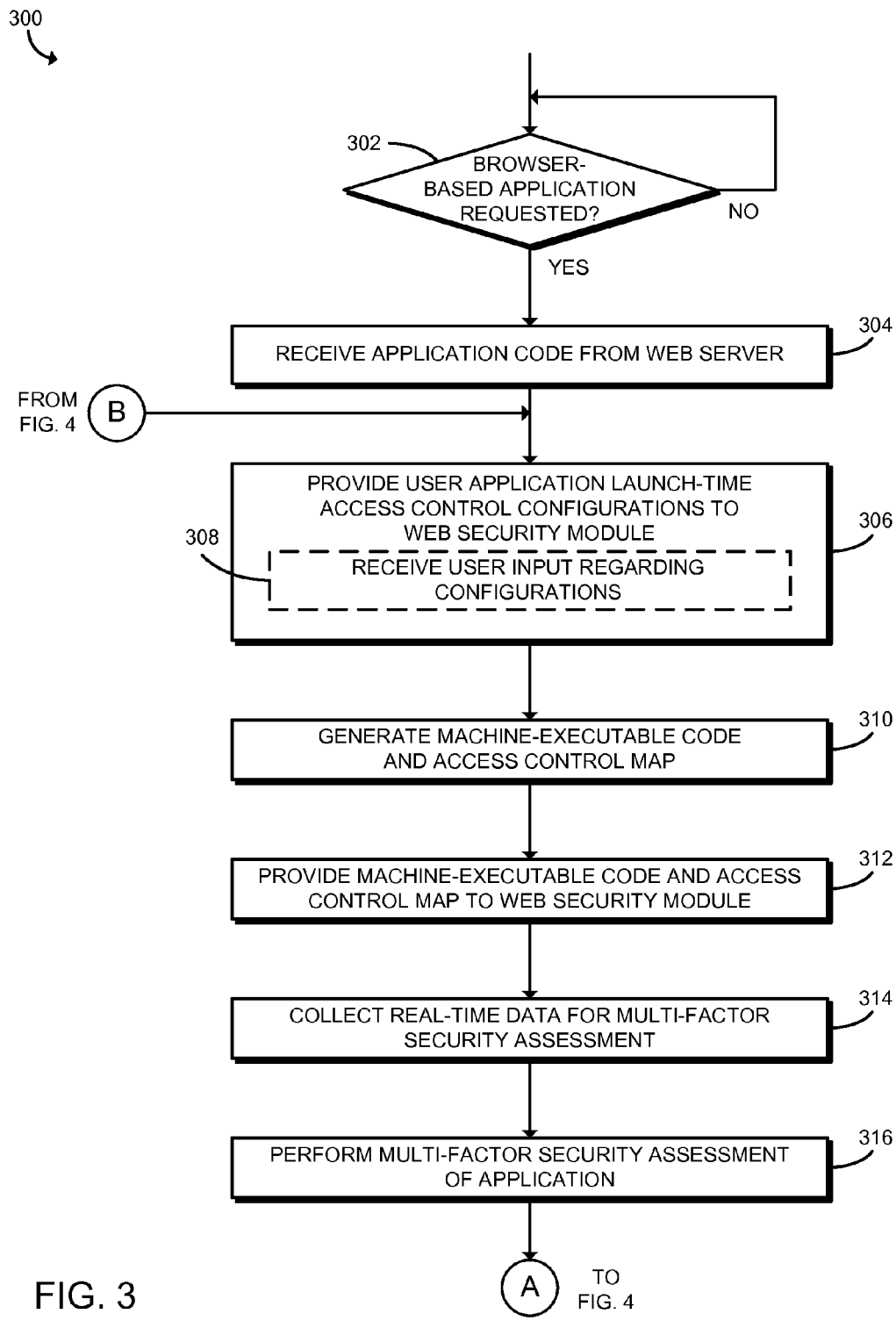
FIGS. 3-4 is a simplified flow diagram of at least one embodiment of a method for client-level web application runtime control and multi-factor security analysis by the computing device of the system of FIG. 1.
Figure 4:
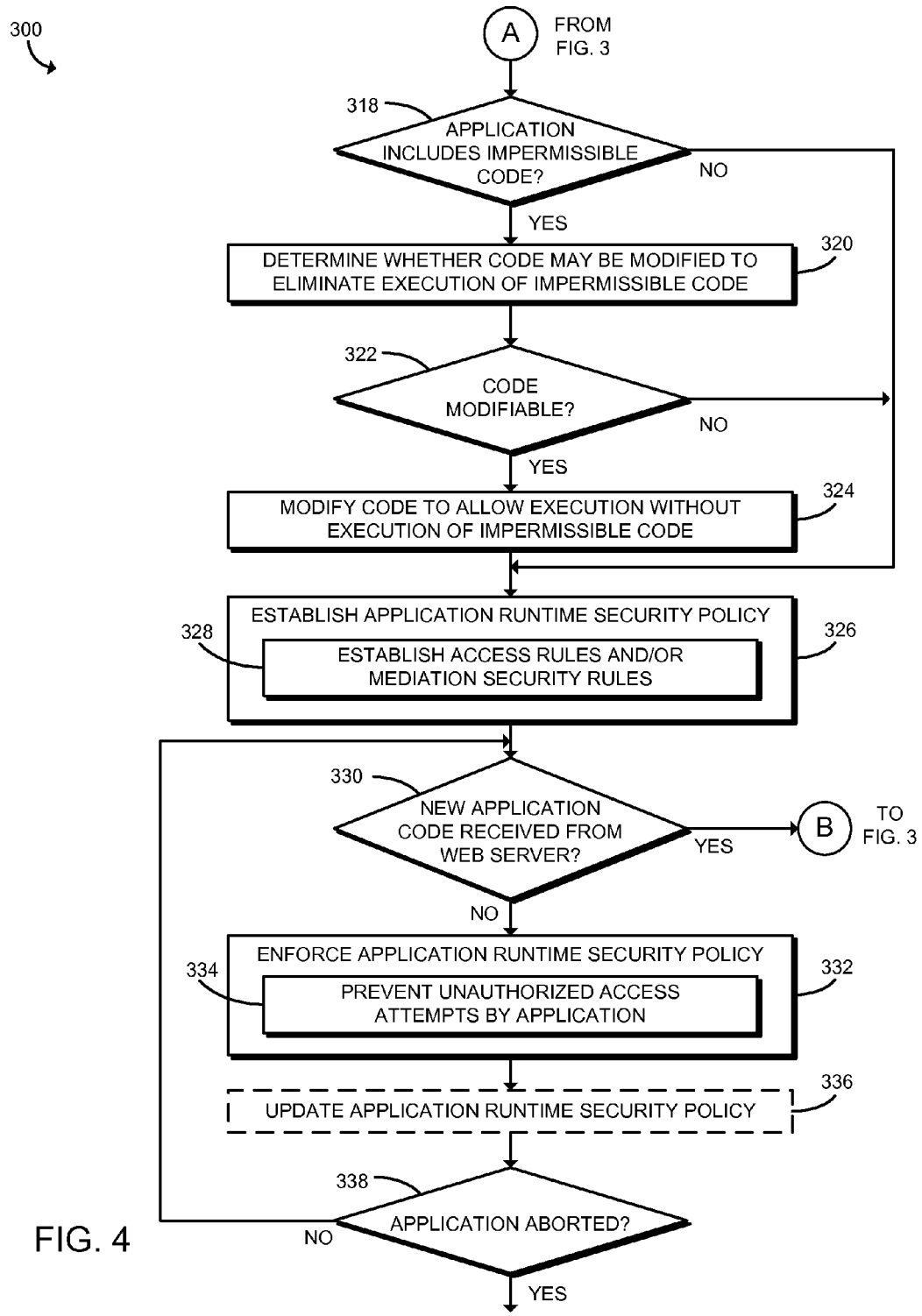

Referring now to FIGS. 3-4, in use, the computing device 102 may execute a method 300 for client-level web application runtime control and multi-factor security analysis. The illustrative method 300 begins with block 302 of FIG. 3 in which the computing device 102 determines whether the computing device 102 has requested a browser-based application 212 from a web server 106. Of course, such a request may occur, for example, when a user of the computing device 102 navigates to a webpage while browsing the Internet or other network. If the computing device 102 has requested the browser-based application 212, the computing device 102 receives (e.g., by downloading) the application code associated with the browser-based application 212 from the web server 106 in block 304. It should be appreciated that some browser-based applications 212 are dynamic, streamed, or otherwise received over time. In such embodiments, the method 300 may be executed for each block, packet, or section of application code transmitted within a certain amount of time. For example, in an embodiment involving streamed application code, the browser security interface 210 may act as a buffer and, at any given point in time, provide a currently buffered segment of machine-executable application code to the web security module 204 for analysis.

In block 306, the computing device 102 provides user application launch-time access control configurations to the web security module 204 (e.g., via the browser security interface 210). As discussed above, in some embodiments, a user can allow or disallow certain application code from being executed using the browser 202 by establishing user application launch-time access control configurations. In doing so, the user may establish static security settings for one or more browser-based applications 212 (e.g., via browser security settings). Alternatively or additionally, the user may establish user application launch-time access control configurations in response to the browser-based application 212 being launched. As such, in block 308, the computing device 102 may receive user input regarding the access control configurations. Further, the computing device 102 may retrieve any static launch-time access control configurations from the data storage 116 or memory 114 of the computing device 102 (e.g., from the security database 126) or from one or more remote devices (e.g., in a cloud environment).

In block 310, the computing device 102 generates machine-executable code and an access control map for the browser-based application 212 (e.g., using the browser security interface 210). In various embodiments, the generated machine-executable code may be bytecode, machine code, binary code, interpreted code, and/or any other suitable code. Further, in other embodiments, the computing device 102 may request a remote device to generate the machine-executable code. As discussed above, the access control map may be generated as a function of the design time rules and the user configurations (i.e., launch time rules) of the browser-based application 212. For example, the developer may establish access control at design time by specifying which hardware 246, firmware, and/or software of the computing device 102 is to be accessed (e.g., by writing to and reading from particular ports). Additionally, the user configurations may prohibit the browser-based application 212 from accessing certain hardware 246 (e.g., particular memory locations or peripheral devices), firmware (e.g., graphics drivers), and/or software (e.g., operation system applications). As such, in some embodiments, the access control map defines or otherwise identifies which hardware 246, firmware, and/or software of the computing device 102 the browser-based application 212 is configured to access without runtime access controls yet imposed.

Figure 5:
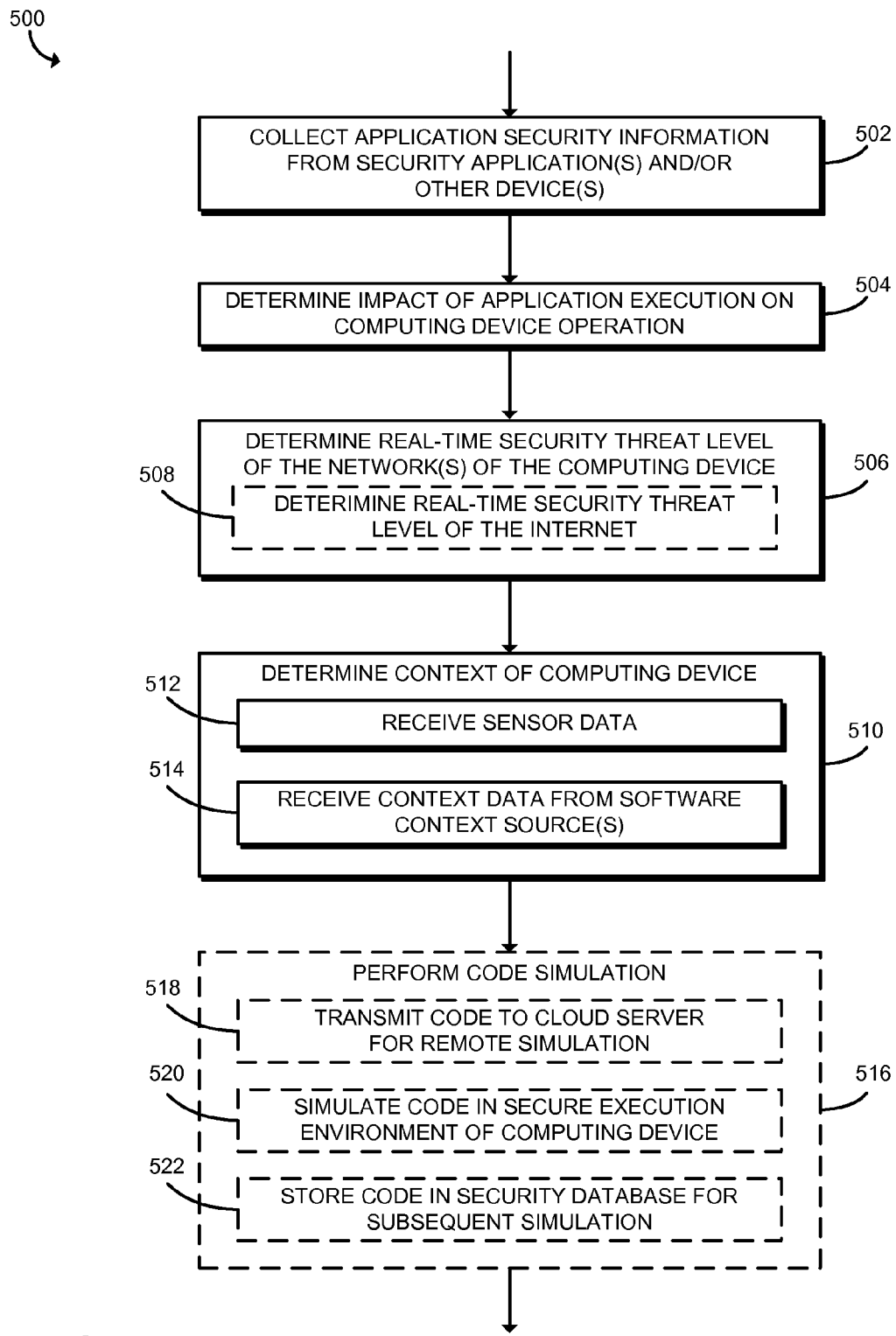
FIG. 5 is a simplified flow diagram of at least one embodiment of a method for collecting real-time data for a multi-factor security assessment by the computing device of the system of FIG. 1.

In block 312, the browser security interface 210 of the computing device 102 provides the generated machine-executable code and access control map to the web security module 204. In block 314, the computing device 102 collects various real-time data to be analyzed in performing a multi-factor security assessment of the application code. To do so, the computing device 102 may execute a method 500 as described in FIG. 5. The illustrative method 500 begins with block 502 in which the computing device 102 collects application security information from one or more security applications 230 of the computing device 102 and/or one or more remote computing devices (e.g., the cloud server 108). As discussed above, in some embodiments, the security applications 230 may include, for example, malware detection, prevent, and/or removal applications. Further, in some embodiments, the computing device 102 transmits the application code to the cloud server 108 for analysis or otherwise provides an indication to the cloud server 108 of the particular application code requiring analysis. For example, in some embodiments, the computing device 102 may provide the cloud server 108 with the URI from which the computing device 102 initially requested the browser-based application 212 from the web server 106. The security applications 230 and/or the cloud-based security verification system may provide the computing device 102 with security results indicating a security level of the application code.

In block 504, the computing device 102 determines the impact of executing the browser-based application 212 on the operation of the computing device 102. As described above, in some embodiments, the computing device 102 determines the impact executing the browser-based application 212 has on non-security parameters of the computing device 102. For example, the computing device 102 may determine the potential impact the browser-based application 212, if executed, that it would have on the performance, latency, power consumption, bandwidth, and/or other parameters of the computing device 102 associated with its operation. Further, in some embodiments, the computing device 102 may determine the impact that execution of the browser-based application 212 would have on the execution of another application, process, or feature of the computing device 102. In block 506, the computing device 102 determines the real-time security threat level of one or more networks 104 of the computing device 102. In particular, in block 508, the computing device 102 may determine the real-time security threat level of the Internet. In other embodiments, the computing device 102 may, additionally or alternatively, determine the threat level of a more specific network 104 of the computing device 102 such as, for example, an enterprise-level network or local area network to which the computing device 102 is connected at the time of analysis. Of course, the computing device 102 may represent the threat level in any suitable manner.

In block 510, the computing device 102 determines the context of the computing device 102 based on data generated by one or more sensors of the computing device 102 (e.g., the hardware sensors 120 and/or the software context sources 232). In doing so, in block 512, the computing device 102 receives sensor data from the hardware sensors 120 of the computing device 102. Additionally, in block 514, the computing device 102 receives context data from the software context sources 232 of the computing device 102. As indicated above, the hardware sensors 120 generate sensor data associated with the computing device 102 including, for example, location data, temporal data, inertial data, and/or other suitable data for analysis by the computing device 102. The software context sources 232 generate/collect data associated with the computing device 102 including data associated with an application and/or other software/firmware module of the computing device 102 (e.g., social networks of the user). In other words, the hardware sensors 120 and the software context sources 232 may collectively generate/collect a vast array of contextual information associated with the environment of the computing device 102, relationships of the computing device 102 and/or the user, and other useful contextual information.

In some embodiments, the computing device 102 may perform a code simulation of the application code in block 516. As discussed above, depending on the particular embodiment, the computing device 102 may perform the code simulation locally or remotely and in real-time or at some subsequent time. As such, in block 518, the computing device 102 may transmit the application code to the cloud server 108 for remote analysis in embodiments in which the cloud server 108 is to perform remote simulation of the code to verify its security. In block 520, the computing device 102 may simulate the application code locally in a secure execution environment of the computing device 102. Further, in block 522, the computing device 102 may store the application code in the security database 238 for subsequent simulation. It should be appreciated that the computing device 102 may perform any one or more of such code simulations depending on the particular embodiment. For example, in some embodiments, the computing device 102 may locally simulate the application code in real-time (e.g., in a local restricted container) and also transmit the application code to the cloud server 108 for real-time analysis of the application code. As described above, the results of the code simulation may be presented in any suitable manner.

Referring back to FIG. 3, in block 316, the computing device 102 performs a multi-factor security assessment of the browser-based application 212 based on the real-time data collected by the computing device 102. That is, the computing device 102 may determine the risk level of the browser-based application 208 and/or otherwise determine whether the browser-based application 208 is a threat to the security of the computing device 102 or otherwise negatively impacts the operation of the computing device 102. In some embodiments, the multi-factor security assessment may be a function of the collected real-time data (e.g., the impact data, the contextual information, the threat information, simulation results, and/or security monitoring data), the application code, the access control map, the design time rules, and/or user configurations. For example, in an embodiment, a security assessment may identify that the browser-based application 212 includes malware in which it is a high security risk. In another embodiment, the security assessment may not indicate anything particularly threatening about the browser-based application 212 to the security of the computing device 102 but may determine that the browser-based application 212 is configured to routinely access a portion of the memory 114 that stores confidential information on the particular computing device 102 (e.g., personal information or private cryptographic keys). As such, despite the browser-based application 212 being "malware free," the computing device 102 may still identify the application as being a security threat. Further, as indicated above, in some embodiments, the computing device 102 may determine that the browser-based application 212 is not a "security" threat specifically but that its operation negatively impacts, for example, a critical aspect of the operation of the computing device 102. In such a case, the computing device 102 may determine that it is unsafe or not recommended to execute the browser-based application 212.

In block 318 of FIG. 4, the computing device 102 determines whether the browser-based application 212 includes impermissible code. For example, the computing device 102 may determine whether the application code includes unsecure, unsafe, malicious, and/or other code that, if executed, could pose a security risk to the computing device 102 or otherwise negatively impact the operation of the computing device 102. In some embodiments, the computing device 102 makes such a determination based, at least in part, on the multi-factor security assessment of the browser-based application 212. Further, it should be appreciated that what constitutes "impermissible code" may vary depending on the particular embodiment. If the application code includes impermissible code, the computing device 102 determines whether the application code may be modified to eliminate execution of the impermissible code in block 320. If the computing device 102 determines, in block 322, that the application code is modifiable, the computing device 102 modifies the application code to allow execution of the browser-based application 212 without execution of the impermissible code in block 324. In some embodiments, the computing device 102 may modify the application code based on identified impermissible code/instructions as a part of the multi-factor security assessment.

Regardless of whether the computing device 102 modifies the application code, in block 326, the computing device 102 establishes an application runtime security policy. In doing so, the computing device 102 may establish hardware, firmware, and/or software access rules and/or mediation security rules in block 328. In some embodiments, the hardware access rules may identify which hardware 246 or which portions of the hardware 246 of the computing device 102 may be authorized for access by the browser-based application 212. For example, the computing device 102 may include an in-band co-processor reserved for a particular function or purpose (e.g., graphics processing, digital signal processing, cryptography, etc.). Further, as discussed above, the computing device 102 may have a peripheral device 122 and/or secure portions of the memory 114 from which the browser-based application 212 should be restricted. In each circumstance, the hardware access rules might identify that particular hardware 246 as inaccessible or otherwise unauthorized for use by the browser-based application 212. Similarly, firmware/software access rules may identify which firmware/software of the computing device 102 the browser-based application 212 may be authorized to access. For example, a firmware access rule may prevent the browser-based application 212 from accessing a device driver (e.g., a graphics driver).

In establishing the mediation security rules, the computing device 102 may identify runtime procedures to be executed by the computing device 102 in the event of the occurrence of a security concern and include the mediation security rules as part of the runtime security policy 238. For example, a particular function or computational operation repeated ad nauseum may, in some circumstances, raise a security concern (e.g., a potential denial of service attack). As such, the runtime security policy 238 may identify a procedure to execute to mediate or otherwise handle such an event or conflict. In another example, the runtime security policy 238 may establish procedures allowing reduced or limited access to the hardware 246, firmware, and/or software than configured or contemplated by the browser-based application 212 by, for example, filtering out unsafe application code.

As discussed above, in some embodiments, the browser-based application 212 may be received by the computing device 102 from the web server 106 dynamically, in a stream, or otherwise received over time. Accordingly, in block 330, the computing device 102 determines whether new application code has been received from the web server 106. If not, the computing device 102 (e.g., via the web security module 204) enforces the runtime security policy 238 in block 332. In doing so, in block 334, the computing device 102 may prevent unauthorized access attempts by the browser-based application 212 to hardware 246, firmware, and/or software of the computing device 102. As discussed above, in some embodiments, the runtime security analysis and enforcement module 214 and hardware management module 216 work in tandem to prevent hardware accesses that are not authorized by the runtime security policy 238 established in block 328. In some embodiments, in block 336, the computing device 102 may update the application runtime security policy 238 based on, for example, unauthorized access attempts by the browser-based application 212, user-requested modifications (e.g., real-time user configuration data), real-time data collected by the computing device 102 (e.g., impact data, contextual information, threat information, simulation results, code modifications, and/or security monitoring data), and/or as a result of other suitable impetuses. In block 338, the computing device 102 determines whether the browser-based application 212 has been aborted. If not, the method 300 returns to block 330 in which the computing device 102 determines whether new application code has been received from the web server 106. If the computing device 102 determines in block 330 that new application code has been received from the web server 106, the method 300 returns to block 306 of FIG. 3 in which the computing device 102 provides user application launch-time access control configurations to the web security module 204.

Figure 6:
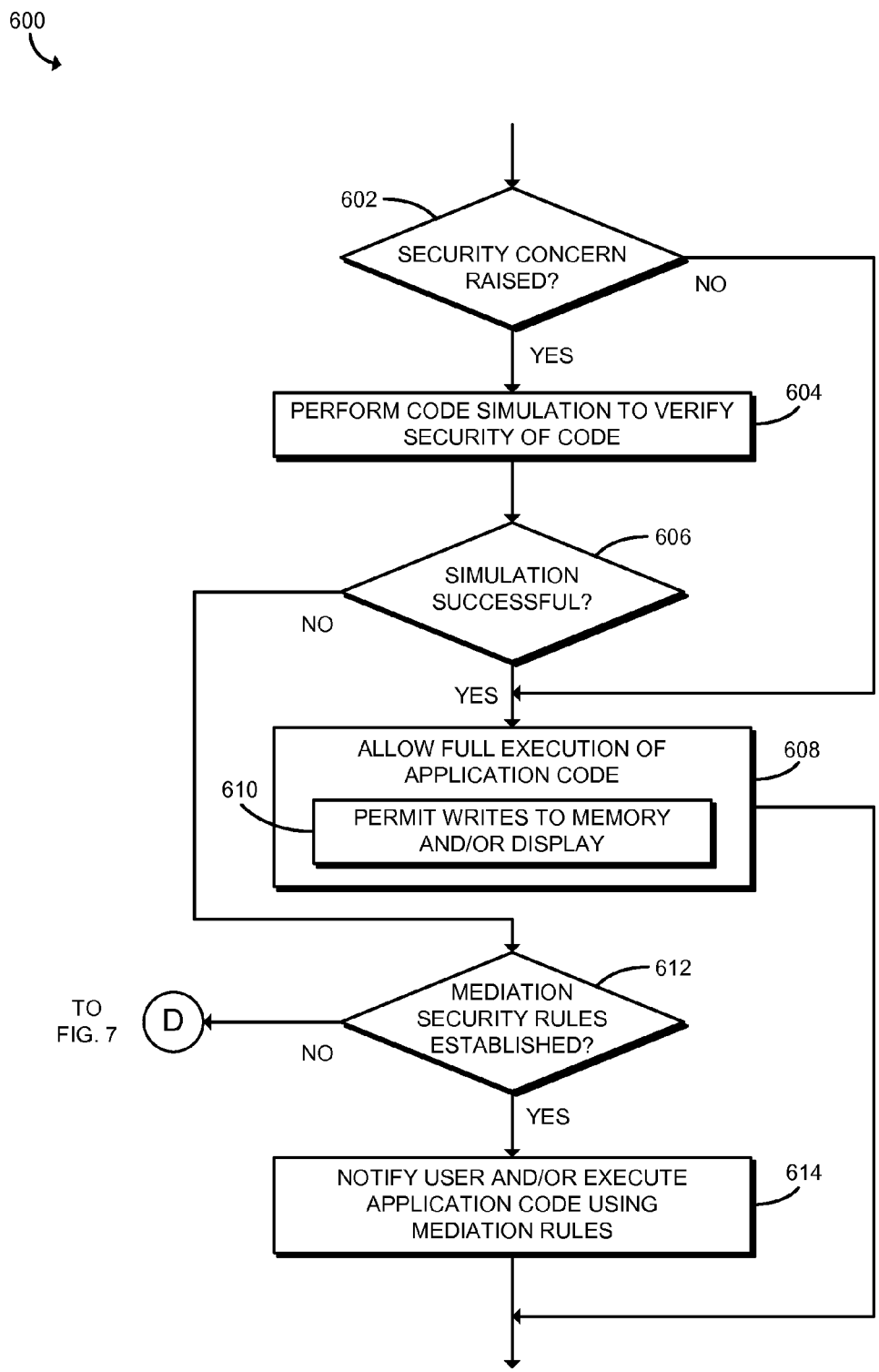
FIGS. 6-7 is a simplified flow diagram of at least one embodiment of a method for enforcing an application runtime security policy on the computing device of the system of FIG. 1.
Figure 7:
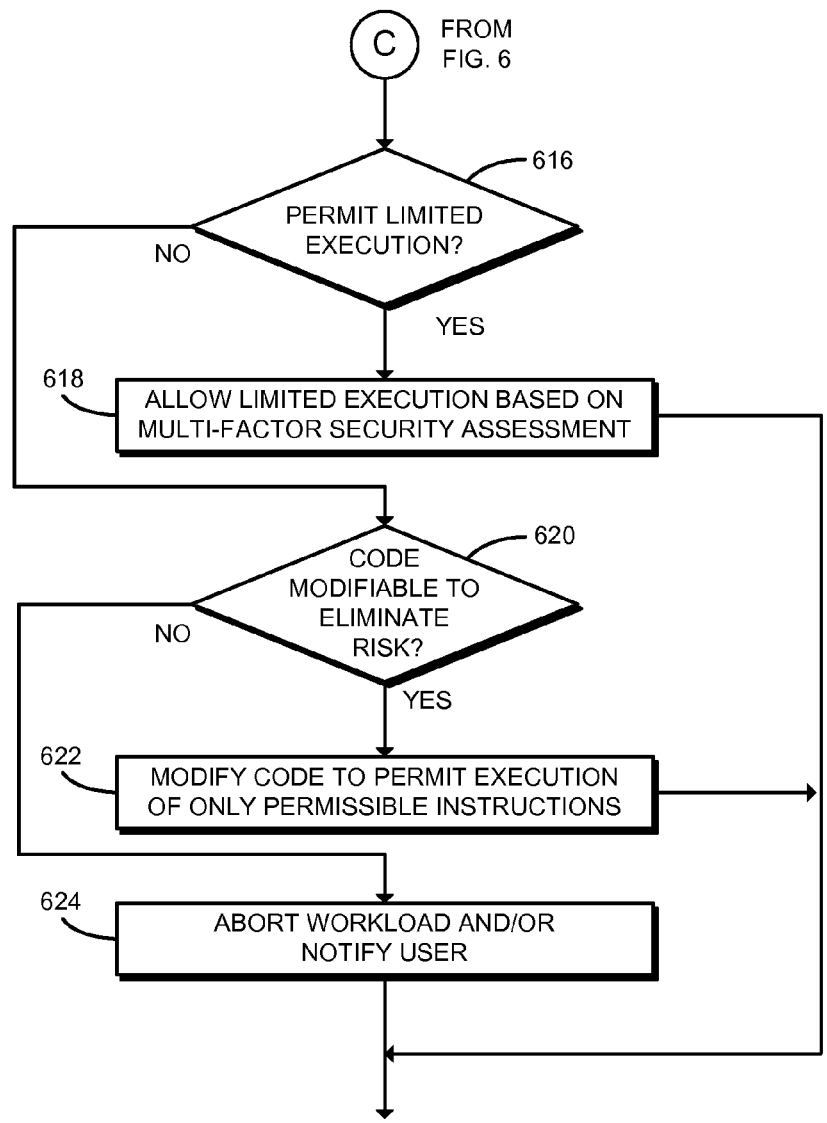

Referring now to FIGS. 6-7, in use, the computing device 102 may execute a method 600 for enforcing an application runtime security policy 238. The illustrative method 600 begins with block 602 of FIG. 6 in which the computing device 102 determines whether the browser-based application 212 raised a security concern. If so, in block 604, the computing device 102 performs code simulation to verify the security of the browser-based application 212. As described above, the computing device 102 may perform the code simulation locally in a secure execution environment (e.g., an application container) and/or request the cloud server 108 to perform cloud-based security verification. In block 606, the computing device 102 determines whether the code simulation was successful. It should be appreciated that what constitutes a "successful" simulation may vary depending on the particular embodiment (e.g., based on the runtime security policy 238). For example, in some embodiments, the computing device 102 determines that the code simulation is successful if execution of the browser-based application 212 would not pose a security threat to the computing device 102 and/or otherwise negatively impact the operation of the computing device 102.

If the computing device 102 determines that the code simulation is successful or determines that the browser-based application 212 does not raise a security concern, the computing device 102 allows full or otherwise typical execution of the application code of the browser-based application 212. That is, in some embodiments, the computing device 102 permits the browser-based application 212 to access the hardware 246 (e.g., the memory 114, the display, and/or other hardware), firmware (e.g., a graphics driver), and/or software of the computing device 102 that the browser-based application 212 is configured to access without runtime access controls imposed in block 610.

Returning to block 606, if the computing device 102 determines that the code simulation was not successful, the computing device 102 determines in block 612 whether mediation security rules have been established as part of the runtime security policy 238. If mediation rules have been established, the computing device 102 may notify the user of the security concern and/or execute the application code using the established mediation security rules in block 614. For example, the computing device 102 may send an alert message to the user of the computing device using the display module 218. In some embodiments, the computing device 102 may not execute the application code unless the user has authorized its execution after having been informed of the security risk.

Returning to block 612, if mediation security rules have not been established in the runtime security policy 238, the computing device 102 may determine in block 616 of FIG. 7 whether to permit partial or limited execution of the application code. If so, the computing device 102 allows limited execution of the application code based on the multi-factor security assessment in block 618. For example, the computing device 102 may grant only partial to the hardware 246, firmware, and/or software of the computing device 102 based on the security assessment. However, if the computing device 102 determined not to permit limited execution in block 616, the computing device 102 determines whether the application code is modifiable to eliminate any risks in block 620. As discussed above, the risks may be associated with the security of the application or non-security factors associated with the operation of the computing device 102 depending on the particular embodiment. If the application code is modifiable, the computing device 102 modifies the application code to permit execution of only permissible instructions in block 622. For example, the computing device 102 may modify the code to remove unauthorized data accesses in some embodiments. It should be appreciated that, in some embodiments, the computing device 102 may modify portions of the application code other than the impermissible code in order to modify the code in a way that only permissible instructions are executed but the code still functions. Returning to block 620, if the computing device 102 determines that the application code is not modifiable, the computing device 102 may abort the workload and/or notify the user in block 624. For example, in an embodiment, the computing device 102 may notify the user that the workload has been aborted so that the user may determine how to respond.

EXAMPLES

Illustrative examples of the technologies disclosed herein are provided below. An embodiment of the technologies may include any one or more, and any combination of, the examples described below.

Example 1 includes a computing device for client-level web application runtime control and multi-factor security analysis, the computing device comprising at least one sensor; a browser to receive application code associated with a browser-based application from a web server; and a web security module to (i) collect real-time data generated by the at least one sensor, (ii) perform a multi-factor security assessment of the browser-based application as a function of the collected real-time data and the application code, (iii) establish a client-level web application runtime security policy associated with the browser-based application in response to the multi-factor security assessment, and (iv) enforce the client-level web application runtime security policy on the computing device, wherein the client-level web application runtime security policy identifies at least one of hardware, firmware, or software access rules to be enforced on the computing device.

Example 2 includes the subject matter of Example 1, and wherein the at least one sensor comprises a hardware sensor and a software context source; and wherein the real-time data comprises (i) a first set of real-time data generated by the hardware sensor and (ii) a second set of real-time data generated by the software context source.

Example 3 includes the subject matter of any of Examples 1 and 2, and wherein to collect the real-time data comprises to determine an impact of execution of the application code on the operation of computing device.

Example 4 includes the subject matter of any of Examples 1-3, and wherein to determine the impact of the execution of the application code comprises to determine an impact of execution of the application code on a parameter of the operation of the computing device unrelated to a maliciousness aspect of the application code.

Example 5 includes the subject matter of any of Examples 1-4, and wherein to determine the impact of the execution of the application code comprises to determine an impact of execution of the application code on concurrent execution of another application of the computing device different from the browser-based application.

Example 6 includes the subject matter of any of Examples 1-5, and wherein to determine the impact of the execution of the application code comprises to determine an impact of execution of the application code on at least one of power consumption or latency of the computing device.

Example 7 includes the subject matter of any of Examples 1-6, and wherein to collect the real-time data comprises to determine a real-time security threat level of a network of the computing device.

Example 8 includes the subject matter of any of Examples 1-7, and wherein to determine the real-time security threat level of the network comprises to determine a real-time security threat level of the Internet.

Example 9 includes the subject matter of any of Examples 1-8, and wherein the at least one sensor comprises at least one of a hardware sensor or a software context source; and wherein to collect the real-time data comprises to determine a context of the computing device based on data received from at least one of the hardware sensor or the software context source.

Example 10 includes the subject matter of any of Examples 1-9, and wherein to collect the real-time data comprises to receive security results from a simulated execution of the application code.

Example 11 includes the subject matter of any of Examples 1-10, and wherein to receive the security results from the simulated execution of the application code comprises to transmit the application code to a cloud server for remote simulation; and receive the security results from the cloud server in response to transmittal of the application code to the cloud server.

Example 12 includes the subject matter of any of Examples 1-11, and further including a secure execution environment, wherein to receive the security results from the simulated execution of the application code comprises to simulate execution of the application code in the secure execution environment.

Example 13 includes the subject matter of any of Examples 1-12, and wherein to collect the real-time data comprises to receive real-time application security monitoring data regarding the application code from one or more security applications.

Example 14 includes the subject matter of any of Examples 1-13, and wherein the web security module is further to determine whether the application code is modifiable to eliminate execution of impermissible code in response to an indication of the multi-factor security assessment that the application code includes the impermissible code; and modify the application code in response to a determination that the application code is modifiable to eliminate the execution of the impermissible code.

Example 15 includes the subject matter of any of Examples 1-14, and wherein to determine whether the application code is modifiable to eliminate the execution of the impermissible code comprises to determine whether the application code is modifiable to eliminate execute of unsecure code.

Example 16 includes the subject matter of any of Examples 1-15, and further including a browser security interface to generate machine-executable code for the application code and an access control map for the application code, wherein to perform the multi-factor security assessment comprises to perform the multi-factor security assessment of the browser-based application as a function of the collected real-time data, the application code, and the access control map.

Example 17 includes the subject matter of any of Examples 1-16, and wherein the access control map is generated as a function of at least one of (i) design time rules for the browser-based application that identify at least one of hardware, firmware, or software of the computing device that the browser-based application is configured to access and (ii) user configurations for the browser-based application that identify at least one of hardware, firmware, or software of the computing device that the browser-based application is configured to access.

Example 18 includes the subject matter of any of Examples 1-17, and further including a browser user interface to receive user input regarding the user configurations.

Example 19 includes the subject matter of any of Examples 1-18, and wherein to establish the client-level web application runtime security policy comprises to establish hardware access rules that identify which hardware of the computing device the browser-based application is authorized to access.

Example 20 includes the subject matter of any of Examples 1-19, and wherein to enforce the established client-level web application runtime security policy comprises to restrict access to hardware of the computing device as a function of the hardware access rules.

Example 21 includes the subject matter of any of Examples 1-20, and wherein to restrict access to the hardware comprises to restrict access to one or more memory addresses of the computing device.

Example 22 includes the subject matter of any of Examples 1-21, and wherein to restrict access to the hardware comprises to restrict access to a peripheral device of the computing device.

Example 23 includes the subject matter of any of Examples 1-22, and wherein to establish the client-level web application runtime security policy comprises to establish firmware access rules that identify which firmware of the computing device the browser-based application is authorized to access.

Example 24 includes the subject matter of any of Examples 1-23, and wherein to enforce the established client-level web application runtime security policy comprises to restrict access to firmware of the computing device as a function of the firmware access rules.

Example 25 includes the subject matter of any of Examples 1-24, and wherein to restrict access to the firmware comprises to restrict access to a graphics driver of the computing device.

Example 26 includes the subject matter of any of Examples 1-25, and wherein to establish the client-level web application runtime security policy comprises to establish software access rules that identify which software of the computing device the browser-based application is authorized to access.

Example 27 includes the subject matter of any of Examples 1-26, and wherein to enforce the established client-level web application runtime security policy comprises to restrict access to software of the computing device as a function of the software access rules.

Example 28 includes the subject matter of any of Examples 1-27, and wherein to establish the client-level web application runtime security policy comprises to establish mediation security rules to be enforced by the computing device in response to a determination that a security concern has been raised.

Example 29 includes the subject matter of any of Examples 1-28, and wherein to enforce the established client-level web application runtime security policy comprises to monitor accesses by the browser-based application to at least one of hardware, firmware, or software of the computing device.

Example 30 includes the subject matter of any of Examples 1-29, and wherein to enforce the established client-level web application runtime security policy comprises to permit the browser-based application limited access to at least one of hardware, firmware, or software of the computing device in response to a determination that a security concern has been raised and no mediation security rules have been established by the computing device.

Example 31 includes the subject matter of any of Examples 1-30, and wherein the browser-based application comprises a Hypertext Markup Language 5 (HTML 5) application.

Example 32 includes a method for client-level web application runtime control and multi-factor security analysis by a computing device, the method comprising receiving, by the computing device, application code associated with a browser-based application from a web server; collecting, by the computing device, real-time data generated by at least one sensor of the computing device; performing, by the computing device, a multi-factor security assessment of the browser-based application as a function of the collected real-time data and the application code; establishing, by the computing device, a client-level web application runtime security policy associated with the browser-based application in response to performing the multi-factor security assessment, the client-level web application runtime security policy identifying at least one of hardware, firmware, or software access rules; and enforcing, by the computing device, the client-level web application runtime security policy.

Example 33 includes the subject matter of Example 32, and wherein collecting the real-time data comprises receiving a first set of real-time data from a hardware sensor of the computing device; and receiving a second set of real-time data from a software context source of the computing device.

Example 34 includes the subject matter of any of Examples 32 and 33, and wherein collecting the real-time data comprises determining an impact of execution of the application code on the operation of the computing device.

Example 35 includes the subject matter of any of Examples 32-34, and wherein determining the impact of the execution of the application code comprises determining an impact of execution of the application code on a parameter of the operation of the computing device unrelated to a maliciousness aspect of the application code.

Example 36 includes the subject matter of any of Examples 32-35, and wherein determining the impact of the execution of the application code comprises determining an impact of execution of the application code on concurrent execution of another application of the computing device different from the browser-based application.

Example 37 includes the subject matter of any of Examples 32-36, and wherein determining the impact of the execution of the application code comprises determining an impact of execution of the application code on at least one of power consumption or latency of the computing device.

Example 38 includes the subject matter of any of Examples 32-37, and wherein collecting the real-time data comprises determining a real-time security threat level of a network of the computing device.

Example 39 includes the subject matter of any of Examples 32-38, and wherein determining the real-time security threat level of the network comprises determining a real-time security threat level of the Internet.

Example 40 includes the subject matter of any of Examples 32-39, and wherein collecting the real-time data comprises determining a context of the computing device based on data generated by at least one of a hardware sensor of the computing device or a software context source of the computing device.

Example 41 includes the subject matter of any of Examples 32-40, and wherein collecting the real-time data comprises receiving security results from a simulated execution of the application code.

Example 42 includes the subject matter of any of Examples 32-41, and wherein receiving the security results from the simulated execution of the application code comprises transmitting the application code to a cloud server for remote simulation; and receiving the security results from the cloud server in response to transmitting the application code to the cloud server.

Example 43 includes the subject matter of any of Examples 32-42, and wherein receiving the security results from the simulated execution of the application code comprises simulating execution of the application code in a secure execution environment of the computing device.

Example 44 includes the subject matter of any of Examples 32-43, and wherein collecting the real-time data comprises receiving real-time application security monitoring data regarding the application code from one or more security applications.

Example 45 includes the subject matter of any of Examples 32-44, and further including determining, by the computing device, whether the application code is modifiable to eliminate execution of impermissible code in response to the multi-factor security assessment indicating that the application code includes the impermissible code; and modifying, by the computing device, the application code in response to determining the application code is modifiable to eliminate the execution of the impermissible code.

Example 46 includes the subject matter of any of Examples 32-45, and wherein determining whether the application code is modifiable to eliminate the execution of the impermissible code comprises determining whether the application code is modifiable to eliminate execute of unsecure code.

Example 47 includes the subject matter of any of Examples 32-46, and further including generating, by the computing device, machine-executable code for the application code; and generating, by the computing device, an access control map for the application code; wherein performing the multi-factor security assessment comprises performing the multi-factor security assessment of the browser-based application as a function of the collected real-time data, the application code, and the access control map.

Example 48 includes the subject matter of any of Examples 32-47, and wherein generating the access control map comprises identifying at least one of (i) design time rules for the browser-based application that identify at least one of hardware, firmware, or software of the computing device that the browser-based application is configured to access and (ii) user configurations for the browser-based application that identify at least one of hardware, firmware, or software of the computing device that the browser-based application is configured to access.

Example 49 includes the subject matter of any of Examples 32-48, and further including receiving, by the computing device, user input regarding the user configurations.

Example 50 includes the subject matter of any of Examples 32-49, and wherein establishing the client-level web application runtime security policy comprises establishing hardware access rules that identify which hardware of the computing device the browser-based application is authorized to access.

Example 51 includes the subject matter of any of Examples 32-50, and wherein enforcing the established client-level web application runtime security policy comprises restricting access to hardware of the computing device as a function of the hardware access rules.

Example 52 includes the subject matter of any of Examples 32-51, and wherein restricting access to the hardware comprises restricting access to one or more memory addresses of the computing device.

Example 53 includes the subject matter of any of Examples 32-52, and wherein restricting access to the hardware comprises restricting access to a peripheral device of the computing device.

Example 54 includes the subject matter of any of Examples 32-53, and wherein establishing the client-level web application runtime security policy comprises establishing firmware access rules that identify which firmware of the computing device the browser-based application is authorized to access.

Example 55 includes the subject matter of any of Examples 32-54, and wherein enforcing the established client-level web application runtime security policy comprises restricting access to firmware of the computing device as a function of the firmware access rules.

Example 56 includes the subject matter of any of Examples 32-55, and wherein restricting access to the firmware comprises restricting access to a graphics driver of the computing device.

Example 57 includes the subject matter of any of Examples 32-56, and wherein establishing the client-level web application runtime security policy comprises establishing software access rules that identify which software of the computing device the browser-based application is authorized to access.

Example 58 includes the subject matter of any of Examples 32-57, and wherein enforcing the established client-level web application runtime security policy comprises restricting access to software of the computing device as a function of the software access rules.

Example 59 includes the subject matter of any of Examples 32-58, and wherein establishing the client-level web application runtime security policy comprises establishing mediation security rules to be enforced by the computing device in response to a security concern being raised.

Example 60 includes the subject matter of any of Examples 32-59, and wherein enforcing the established client-level web application runtime security policy comprises monitoring accesses by the browser-based application to at least one of hardware, firmware, or software of the computing device.

Example 61 includes the subject matter of any of Examples 32-60, and wherein enforcing the established client-level web application runtime security policy comprises permitting the browser-based application limited access to at least one of hardware, firmware, or software of the computing device in response to a security concern being raised and no mediation security rules having been established by the computing device.

Example 62 includes the subject matter of any of Examples 32-61, and wherein receiving the application code comprises receiving Hypertext Markup Language 5 (HTML 5) application code.

Example 63 includes a computing device comprising a processor; and a memory having stored therein a plurality of instructions that when executed by the processor cause the computing device to perform the method of any of Examples 32-62.

Example 64 includes one or more machine-readable storage media comprising a plurality of instructions stored thereon that, in response to execution by a computing device, cause the computing device to perform the method of any of Examples 32-62.

Example 65 includes a computing device for client-level web application runtime control and multi-factor security analysis, the computing device comprising means for receiving application code associated with a browser-based application from a web server; means for collecting real-time data generated by at least one sensor of the computing device; means for performing a multi-factor security assessment of the browser-based application as a function of the collected real-time data and the application code; means for establishing a client-level web application runtime security policy associated with the browser-based application in response to the multi-factor security assessment, wherein the client-level web application runtime security policy identifies at least one of hardware, firmware, or software access rules; and means for enforcing the client-level web application runtime security policy.

Example 66 includes the subject matter of Example 65, and wherein the means for collecting the real-time data comprises means for receiving a first set of real-time data from a hardware sensor of the computing device; and means for receiving a second set of real-time data from a software context source of the computing device.

Example 67 includes the subject matter of any of Examples 65 and 66, and wherein the means for collecting the real-time data comprises means for determining an impact of execution of the application code on the operation of the computing device.

Example 68 includes the subject matter of any of Examples 65-67, and wherein the means for determining the impact of the execution of the application code comprises means for determining an impact of execution of the application code on a parameter of the operation of the computing device unrelated to a maliciousness aspect of the application code.

Example 69 includes the subject matter of any of Examples 65-68, and wherein the means for determining the impact of the execution of the application code comprises means for determining an impact of execution of the application code on concurrent execution of another application of the computing device different from the browser-based application.

Example 70 includes the subject matter of any of Examples 65-69, and wherein the means for determining the impact of the execution of the application code comprises means for determining an impact of execution of the application code on at least one of power consumption or latency of the computing device.

Example 71 includes the subject matter of any of Examples 65-70, and wherein the means for collecting the real-time data comprises means for determining a real-time security threat level of a network of the computing device.

Example 72 includes the subject matter of any of Examples 65-71, and wherein the means for determining the real-time security threat level of the network comprises means for determining a real-time security threat level of the Internet.

Example 73 includes the subject matter of any of Examples 65-72, and wherein the means for collecting the real-time data comprises means for determining a context of the computing device based on data generated by at least one of a hardware sensor of the computing device or a software context source of the computing device.

Example 74 includes the subject matter of any of Examples 65-73, and wherein the means for collecting the real-time data comprises means for receiving security results from a simulated execution of the application code.

Example 75 includes the subject matter of any of Examples 65-74, and wherein the means for receiving the security results from the simulated execution of the application code comprises means for transmitting the application code to a cloud server for remote simulation; and means for receiving the security results from the cloud server in response to transmitting the application code to the cloud server.

Example 76 includes the subject matter of any of Examples 65-75, and wherein the means for receiving the security results from the simulated execution of the application code comprises means for simulating execution of the application code in a secure execution environment of the computing device.

Example 77 includes the subject matter of any of Examples 65-76, and wherein the means for collecting the real-time data comprises means for receiving real-time application security monitoring data regarding the application code from one or more security applications.

Example 78 includes the subject matter of any of Examples 65-77, and further including means for determining whether the application code is modifiable to eliminate execution of impermissible code in response to the multi-factor security assessment indicating that the application code includes the impermissible code; and means for modifying the application code in response to a determination that the application code is modifiable to eliminate the execution of the impermissible code.

Example 79 includes the subject matter of any of Examples 65-78, and wherein the means for determining whether the application code is modifiable to eliminate the execution of the impermissible code comprises means for determining whether the application code is modifiable to eliminate execute of unsecure code.

Example 80 includes the subject matter of any of Examples 65-79, and further including means for generating machine-executable code for the application code; and means for generating an access control map for the application code; wherein the means for performing the multi-factor security assessment comprises means for performing the multi-factor security assessment of the browser-based application as a function of the collected real-time data, the application code, and the access control map.

Example 81 includes the subject matter of any of Examples 65-80, and wherein the means for generating the access control map comprises means for identifying at least one of (i) design time rules for the browser-based application that identify at least one of hardware, firmware, or software of the computing device that the browser-based application is configured to access and (ii) user configurations for the browser-based application that identify at least one of hardware, firmware, or software of the computing device that the browser-based application is configured to access.

Example 82 includes the subject matter of any of Examples 65-81, and further including means for receiving user input regarding the user configurations.

Example 83 includes the subject matter of any of Examples 65-82, and wherein the means for establishing the client-level web application runtime security policy comprises means for establishing hardware access rules that identify which hardware of the computing device the browser-based application is authorized to access.

Example 84 includes the subject matter of any of Examples 65-83, and wherein the means for enforcing the established client-level web application runtime security policy comprises means for restricting access to hardware of the computing device as a function of the hardware access rules.

Example 85 includes the subject matter of any of Examples 65-84, and wherein the means for restricting access to the hardware comprises means for restricting access to one or more memory addresses of the computing device.

Example 86 includes the subject matter of any of Examples 65-85, and wherein the means for restricting access to the hardware comprises means for restricting access to a peripheral device of the computing device.

Example 87 includes the subject matter of any of Examples 65-86, and wherein the means for establishing the client-level web application runtime security policy comprises means for establishing firmware access rules that identify which firmware of the computing device the browser-based application is authorized to access.

Example 88 includes the subject matter of any of Examples 65-87, and wherein the means for enforcing the established client-level web application runtime security policy comprises means for restricting access to firmware of the computing device as a function of the firmware access rules.

Example 89 includes the subject matter of any of Examples 65-88, and wherein the means for restricting access to the firmware comprises means for restricting access to a graphics driver of the computing device.

Example 90 includes the subject matter of any of Examples 65-89, and wherein the means for establishing the client-level web application runtime security policy comprises means for establishing software access rules that identify which software of the computing device the browser-based application is authorized to access.

Example 91 includes the subject matter of any of Examples 65-90, and wherein the means for enforcing the established client-level web application runtime security policy comprises means for restricting access to software of the computing device as a function of the software access rules.

Example 92 includes the subject matter of any of Examples 65-91, and wherein the means for establishing the client-level web application runtime security policy comprises means for establishing mediation security rules to be enforced by the computing device in response to a security concern being raised.

Example 93 includes the subject matter of any of Examples 65-92, and wherein the means for enforcing the established client-level web application runtime security policy comprises means for monitoring accesses by the browser-based application to at least one of hardware, firmware, or software of the computing device.

Example 94 includes the subject matter of any of Examples 65-93, and wherein the means for enforcing the established client-level web application runtime security policy comprises means for permitting the browser-based application limited access to at least one of hardware, firmware, or software of the computing device in response to a security concern being raised and no mediation security rules having been established by the computing device.

Example 95 includes the subject matter of any of Examples 65-94, and the wherein the browser-based application comprises a Hypertext Markup Language 5 (HTML 5) application.

The invention claimed is:

1. A computing device for client-level web application runtime control and multi-factor security analysis, the computing device comprising:
at least one sensor;
a browser to receive application code associated with a browser-based application from a web server; and
a web security module to (i) collect real-time data generated by the at least one sensor, (ii) perform a multi-factor security assessment of the browser-based application as a function of the collected real-time data and the application code, (iii) determine whether the application code is modifiable to eliminate execution of impermissible code in response to an indication of the multi-factor security assessment that the application code includes the impermissible code, (iv) modify the application code in response to a determination that the application code is modifiable to eliminate the execution of the impermissible code, (v) establish a client-level web application runtime security policy associated with the browser-based application in response to the multi-factor security assessment, and (vi) enforce the client-level web application runtime security policy on the computing device,
wherein the client-level web application runtime security policy identifies at least one of hardware, firmware, or software access rules to be enforced on the computing device.

2. The computing device of claim 1, wherein to collect the real-time data comprises to determine an impact of execution of the application code on the operation of computing device.

3. The computing device of claim 2, wherein to determine the impact of the execution of the application code comprises to determine an impact of execution of the application code on a parameter of the operation of the computing device unrelated to a maliciousness aspect of the application code.

4. The computing device of claim 2, wherein to determine the impact of the execution of the application code comprises to determine an impact of execution of the application code on concurrent execution of another application of the computing device different from the browser-based application.

5. The computing device of claim 2, wherein to determine the impact of the execution of the application code comprises to determine an impact of execution of the application code on at least one of power consumption or latency of the computing device.

6. The computing device of claim 1, wherein to collect the real-time data comprises to determine a real-time security threat level of a network of the computing device.

7. The computing device of claim 1, wherein the at least one sensor comprises at least one of a hardware sensor or a software context source; and
wherein to collect the real-time data comprises to determine a context of the computing device based on data received from at least one of the hardware sensor or the software context source.

8. The computing device of claim 1, wherein to collect the real-time data comprises to:
transmit the application code to a cloud server for remote simulation of the application code; and receive security results from the cloud server in response to transmittal of the application code to the cloud server.

9. The computing device of claim 1, further comprising a secure execution environment, wherein to collect the real-time data comprises to:
simulate execution of the application code in the secure execution environment; and
receive security results from the simulated execution of the application code.

10. The computing device of claim 1, further comprising:
a browser security interface to generate machine-executable code for the application code and an access control map for the application code,
wherein to perform the multi-factor security assessment comprises to perform the multi-factor security assessment of the browser-based application as a function of the collected real-time data, the application code, and the access control map.

11. The computing device of claim 10, wherein the access control map is generated as a function of at least one of (i) design time rules for the browser-based application that identify at least one of hardware, firmware, or software of the computing device that the browser-based application is configured to access and (ii) user configurations for the browser-based application that identify at least one of hardware, firmware, or software of the computing device that the browser-based application is configured to access.

12. The computing device of claim 1, wherein to establish the client-level web application runtime security policy comprises to establish hardware access rules that identify which hardware of the computing device the browser-based application is authorized to access; and
wherein to enforce the established client-level web application runtime security policy comprises to restrict access to hardware of the computing device as a function of the hardware access rules.

13. The computing device of claim 1, wherein to establish the client-level web application runtime security policy comprises to establish firmware access rules that identify which firmware of the computing device the browser-based application is authorized to access; and
wherein to enforce the established client-level web application runtime security policy comprises to restrict access to firmware of the computing device as a function of the firmware access rules.

14. The computing device of claim 1, wherein to establish the client-level web application runtime security policy comprises to establish software access rules that identify which software of the computing device the browser-based application is authorized to access.

15. One or more non-transitory machine-readable storage media comprising a plurality of instructions stored thereon that, in response to execution by a computing device, cause the computing device to:
receive application code associated with a browser-based application from a web server;
generate real-time data with at least one sensor of the computing device;
collect the real-time data generated by the at least one sensor of the computing device;
perform a multi-factor security assessment of the browser-based application as a function of the collected real-time data and the application code;
determine whether the application code is modifiable to eliminate execution of impermissible code in response to an indication by the multi-factor security assessment that the application code includes the impermissible code;
modify the application code in response to a determination that the application code is modifiable to eliminate the execution of the impermissible code;
establish a client-level web application runtime security policy associated with the browser-based application in response to performing the multi-factor security assessment, wherein the client-level web application runtime security policy identifying at least one of hardware, firmware, or software access rules; and
enforce the client-level web application runtime security policy.

16. The one or more non-transitory machine-readable storage media of claim 15, wherein to collect the real-time data comprises to determine an impact of execution of the application code on the operation of the computing device.

17. The one or more non-transitory machine-readable storage media of claim 15, wherein to collect the real-time data comprises to determine a real-time security threat level of a network of the computing device.

18. The one or more non-transitory machine-readable storage media of claim 15, wherein to collect the real-time data comprises to determine a context of the computing device based on data generated by at least one of a hardware sensor of the computing device or a software context source of the computing device.

19. The one or more non-transitory machine-readable storage media of claim 15, wherein to collect the real-time data comprises to receive security results from a simulated execution of the application code.

20. The one or more non-transitory machine-readable storage media of claim 15, wherein the plurality of instructions further cause the computing device to:
generate machine-executable code for the application code; and
generate an access control map for the application code;
wherein to perform the multi-factor security assessment comprises to perform the multi-factor security assessment of the browser-based application as a function of the collected real-time data, the application code, and the access control map.

21. The one or more non-transitory machine-readable storage media of claim 15, wherein to generate the access control map comprises to identify at least one of (i) design time rules for the browser-based application that identify at least one of hardware, firmware, or software of the computing device that the browser-based application is configured to access and (ii) user configurations for the browser-based application that identify at least one of hardware, firmware, or software of the computing device that the browser-based application is configured to access.

22. A method for client-level web application runtime control and multi-factor security analysis by a computing device, the method comprising:
receiving, by the computing device, application code associated with a browser-based application from a web server;
generating real-time sensor data with at least one sensor of the computing device;
collecting, by the computing device, the real-time data generated by the at least one sensor of the computing device;

performing, by the computing device, a multi-factor security assessment of the browser-based application as a function of the collected real-time data and the application code;

determining, by the computing device, whether the application code is modifiable to eliminate execution of impermissible code in response to an indication by the multi-factor security assessment that the application code includes the impermissible code;

modifying, by the computing device, the application code in response to a determination that the application code is modifiable to eliminate the execution of the impermissible code;

establishing, by the computing device, a client-level web application runtime security policy associated with the browser-based application in response to performing the multi-factor security assessment, the client-level web application runtime security policy identifying at least one of hardware, firmware, or software access rules; and enforcing, by the computing device, the client-level web application runtime security policy.

23. The method of claim 22, wherein collecting the real-time data comprises:

determining an impact of execution of the application code on the operation of the computing device;

determining a real-time security threat level of a network of the computing device;

determining a context of the computing device based on data generated by at least one of a hardware sensor of the computing device or a software context source of the computing device; and receiving security results from a simulated execution of the application code.

* * * * *